United States Patent [19]

Sekine et al.

[11] Patent Number: 4,969,368

[45] Date of Patent: Nov. 13, 1990

[54] OSCILLATION GENERATING APPARATUS

[75] Inventors: Tadashi Sekine, Tatebayashi; Tsuneo Akuto, Kiryu, both of Japan

[73] Assignee: Mitsuba Electric Mfg. Co., Ltd., Gumma, Japan

[21] Appl. No.: 304,297

[22] Filed: Jan. 30, 1989

[30] Foreign Application Priority Data

| | | | |
|---|---|---|---|
| Jan. 29, 1988 | [JP] | Japan | 63-18645 |
| Feb. 3, 1988 | [JP] | Japan | 63-23046 |
| Feb. 3, 1988 | [JP] | Japan | 63-23047 |
| Aug. 5, 1988 | [JP] | Japan | 63-195353 |
| Aug. 5, 1988 | [JP] | Japan | 63-103991[U] |

[51] Int. Cl.$^5$ .............. F16H 25/18

[52] U.S. Cl. .............. 74/54; 74/569

[58] Field of Search .............. 74/54, 569

[56] References Cited

U.S. PATENT DOCUMENTS

| | | | |
|---|---|---|---|
| 1,312,328 | 8/1919 | Johansson | 74/54 |
| 3,103,823 | 9/1963 | Aiki | 74/54 |
| 4,583,728 | 4/1986 | Mathes | 74/54 X |

FOREIGN PATENT DOCUMENTS

| | | | |
|---|---|---|---|
| 38512 | 8/1909 | Austria | 74/54 |

*Primary Examiner*—Allan D. Herrmann
*Attorney, Agent, or Firm*—Darby & Darby

[57] ABSTRACT

An oscillation generating apparatus which has an oscillating shaft supported rotatable about an axis thereof, at least a cam follower attached eccentric to the oscillating shaft, at least a pair of drive shafts disposed parallel to the oscillating shaft and adapted to be connected to drive means to be rotated thereby; and at least a pair of cams attached to the pair of drive shafts for rotational movement therewith and kept in sliding contact with the cam follower, shape and location of the cams being so determined that at least one of the cams gives thrust force to the cam follower at any rotational angle of the oscillating shaft as the drive shafts are bieng rotated, whereby rotational movement of the drive shafts being converted to a back-and-forth rotational movement of the oscillating shaft. With the apparatus, a high rotational speed of the drive shaft can be correctly converted to a back-and-forth rotational movement of the oscillating shaft. Further, an arbitrary desired temporary change of the angular movement of the oscillating shaft can be obtained.

10 Claims, 13 Drawing Sheets

OSCILLATION GENERATING APPARATUS

BACKGROUND OF THE INVENTION

1. Field of the Invention

This invention relates to an oscillation generating apparatus which is suitably used in a testing machine, etc.

2. Prior Art

There are conventional oscillation generating apparatus having a cam mechanism.

A conventional oscillation generating apparatus comprises a crankshaft supported rotatable about its axis, a cam attached to the crankshaft, an oscillating shaft disposed parallel to the crankshaft, an oscillating arm attached to the oscillating shaft perpendicular thereto and extending toward the crankshaft, and a connecting rod attached to a distal end of the oscillating arm and kept in sliding contact with the cam. The connecting rod is pressed against the cam by elastic means so that it keeps in contact with the cam.

The crankshaft is rotated by a motor or an engine etc. at generally a constant speed. The cam is rotated together with the crankshaft. As the cam rotates, the distance of the contact point, where the cam and the connecting rod are in contact, and the axis of the crankshaft varies. Then the connecting rod rotates forward and backward about the oscillating shaft as it slides on the peripheral surface of the cam. Movement of the connecting rod is transmitted to the oscillating shaft through the oscillating arm and the oscillating shaft rotates forward and backward about its axis. In other words, the angle of the oscillating shaft varies as a function of time while the rotational speed of the crankshaft is constant. The angular variation with time of the oscillating shaft is determined by the shape of the cam.

According to the apparatus described above, the connecting rod is kept in contact with the cam by virtue of the elasticity of the elastic means. But, when the rotational speed of the crankshaft becomes high, the connecting rod tends to come apart from the cam because the connecting rod can not move fast enough to trace the shape of the cam. A solution for keeping the connecting rod in contact with the cam is to increase the elastic force pressing the connecting rod to the cam, but this causes other problems such as wear and fatigue of the materials etc. Therefore, maximum rotational speed of the crankshaft is limited so as not to cause disconnection between the cam and the contact rod.

Another problem for the conventional apparatus is that movement of the oscillating shaft involving an abrupt change in angular acceleration is difficult to produce even when the rotational speed of the crankshaft is relatively low because the maximum possible angular acceleration is limited to a low value due to inertia. Therefore, variations in angular acceleration of the conventional oscillating shaft are limited to those containing relatively moderate angular acceleration.

SUMMARY OF THE INVENTION

An object of the present invention is therefore to provide an apparatus by which a high rotational speed of a drive shaft is correctly converted to a back-and-forth rotational movement of an oscillating shaft.

Another object of the present invention is to provide an apparatus by which an arbitrary desired temporary change of the angular movement of the oscillating shaft is obtained.

According to an aspect of the present invention, there is provided an oscillation generating apparatus comprising:

(a) an oscillating shaft supported rotatable about an axis thereof;

(b) at least a cam follower attached eccentric to the oscillating shaft;

(c) at least a pair of drive shafts disposed parallel to the oscillating shaft and adapted to be connected to drive means to be rotated thereby; and (d) at least a pair of cams attached to the pair of drive shafts for rotational movement therewith and kept in sliding contact with the cam follower, the shape and location of the cams being so determined that at least one of the cams gives a thrust force to the cam follower at any rotational angle of the oscillating shaft as the drive shafts are being rotated; whereby rotational movement of the drive shafts is converted to an back-and-forth rotational movement of the oscillating shaft.

BRIEF DESCRIPTION OF THE DRAWINGS

The present invention will now be described with reference to the accompanying drawings wherein.

DESCRIPTION OF PREFERRED EMBODIMENTS OF THE INVENTION

Figure 1:
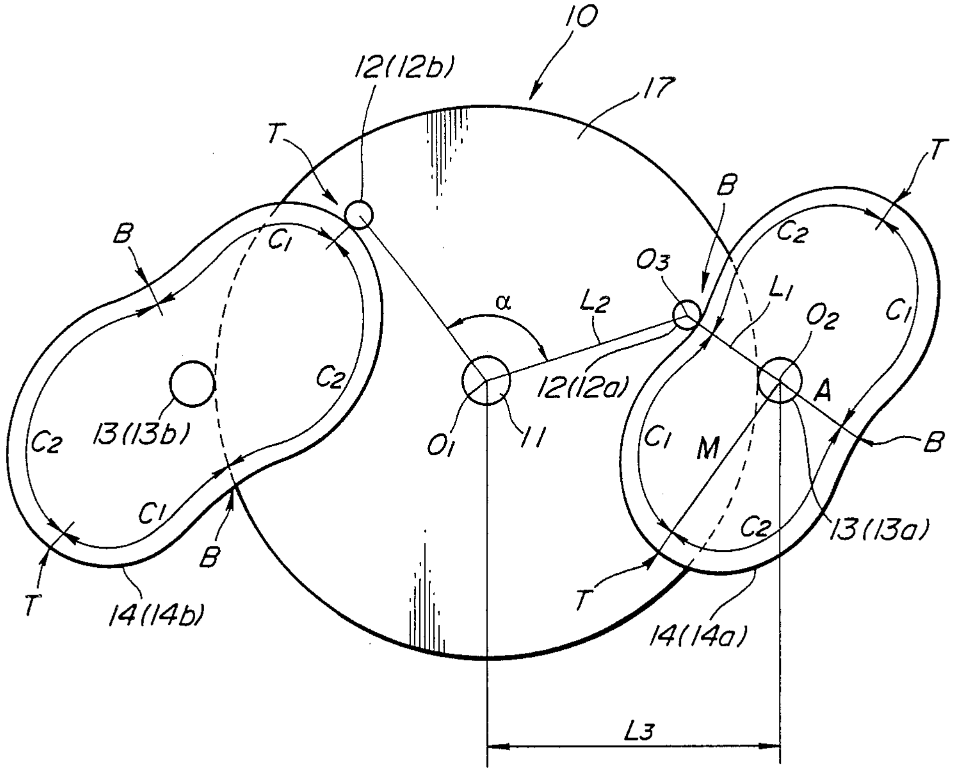
FIG. 1 is a schematic plan view showing an apparatus in accordance with the present invention.
Figure 2:
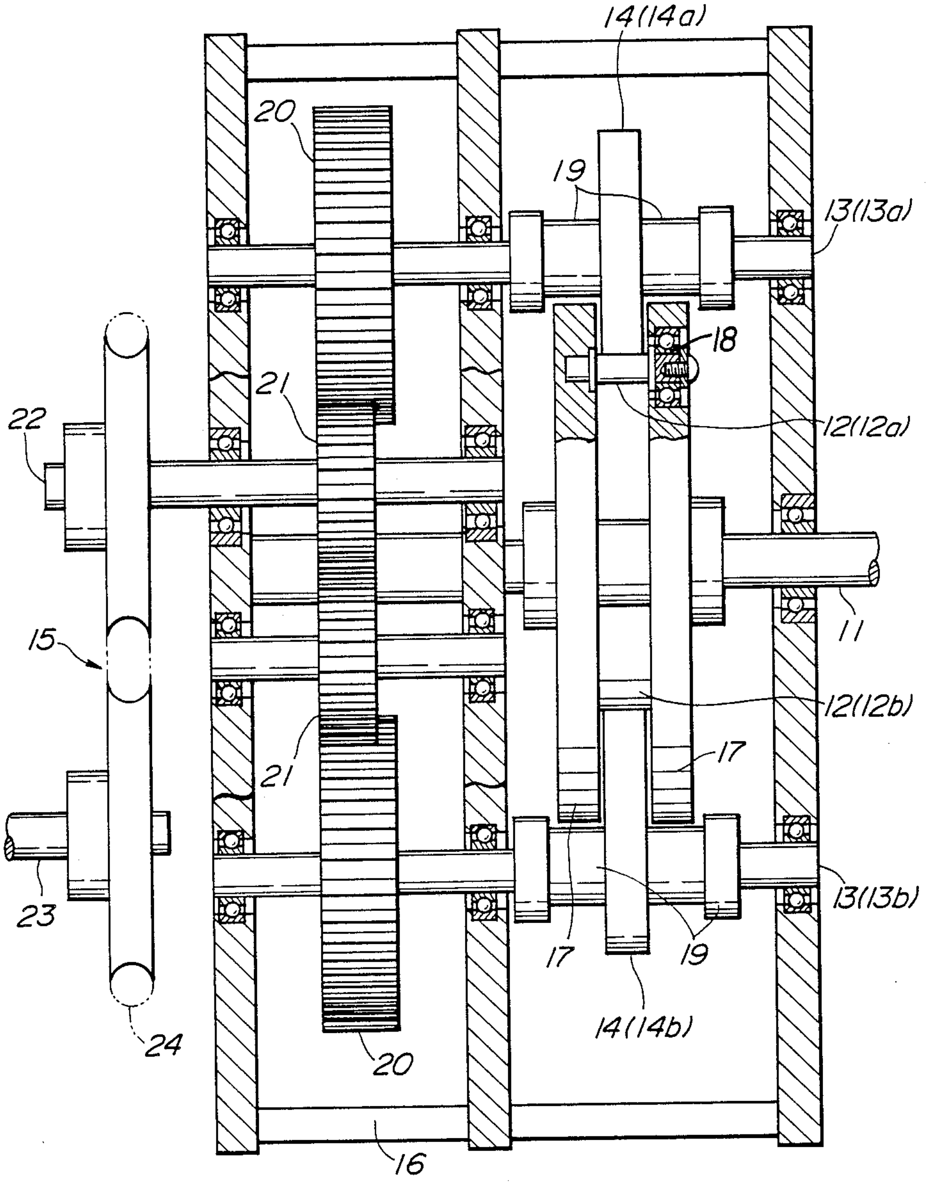
FIG. 2 is a schematic transverse cross-sectional view of the apparatus of FIG. 1.

FIGS. 1 to 10 illustrate an oscillation generating apparatus according to the present invention. Oscillation generating apparatus 10 includes an oscillating shaft 11 supported rotatably about an axis thereof, a pair of cam followers 12 (12*a* and 12*b*) for oscillating about the oscillating shaft 11, the respective cam followers 12 attached to a circular plate 17 at a distance of $L_2$ and separated from one another in an oscillation direction of the oscillating shaft 11 with an angle $\alpha$ defined between the oscillating shaft 11 and the cam followers 12 about the oscillating shaft 11, a pair of drive shafts 13 radially spaced from the oscillating shaft 11 on both sides facing the cam followers 12 and extending in a longitudinal direction of the axis of the oscillating shaft 11, a pair of cams 14 securely attached to the respective drive shafts 13 so as to be rotated therewith a drive means 15 for rotating synchronously both drive shafts 13 as shown in FIG. 2. In this apparatus 10, each of the cams 14 has a cam surface denoted by a symbol C formed at a periphery thereof, the cam surface C including a first portion $c_1$ for guiding the cam follower 12*a* or 12*b* so as to be apart from the drive shaft 13*a* or 13*b* when the cam 14*a* or 14*b* is angularly moved at a predetermined angle and a second portion $c_2$ for guiding the cam follower 12*a* or 12*b* so as to be close to the drive shaft 13*a* or 13*b*. As to the respective cams 14, the cam surface C is put in contact with the cam follower 12*a* or 12*b*. Further, the first portion $c_1$ of the cam surface C of one cam 14 is put in contact with one cam follower 12*a* when the second portion $c_2$ of the cam surface C of the other cam 14 is put in contact with the other cam follower 12*b*.

Figure 3:
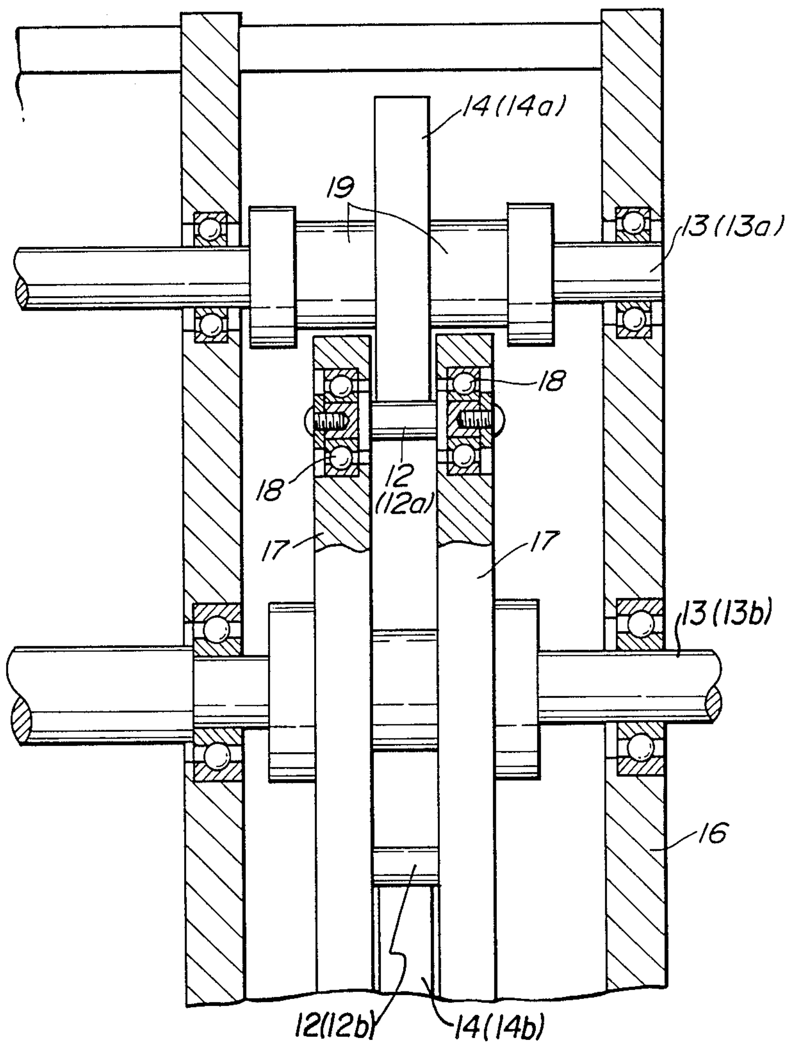
FIG. 3 is a schematic transverse cross-sectional view of a cam follower mounted in the apparatus of FIG. 1.

Specifically, the oscillating shaft 11 is rotatably disposed at a base 16 as shown in FIG. 2. A pair of circular plates 17 are fixedly disposed on surfaces of the oscillating shaft 11 spaced at a predetermined interval in a longitudinal direction of the oscillating shaft 11 and coaxially disposed therewith. As shown in FIG. 3, opposite ends of the cam followers 12*a* and 12*b* are rotatably supported through bearings 18 on the circular plates 17 so as to be inserted therebetween. This structure can bear a large force or load exerted on a portion where the cams 14*a* and 14*b* come in contact with the cam followers 12*a* and 12*b* while enabling the outer diameter of the cam follower 12*a* or 12*b* connected with the cam 14*a* or 14*b* to be reduced.

Each of the cams 14*a* and 14*b* is securely disposed on the respective drive shafts 13*a* and 13*b* by means of clamps 19.

As shown in FIG. 1, in this embodiment of the present invention, each of the cams 14*a* and 14*b* has a pair of top portions T formed on the cam surface C at a predetermined interval in a direction of rotation of the cam 14*a* or 14*b* and a pair of bottom portions B formed on the cam surface C defined between both top portions T at a predetermined interval in the direction of rotation of the cam 14*a* or 14*b*. That is, the top portion T and the bottom portion B are formed one after the other in the direction of rotation of the cam 14*a* or 14*b*. A distance between the drive shaft 13 and the top portion T or a long radius of the cam 14 is larger than a distance between the drive shaft 13 and the bottom portion B or a short radius of the cam 14. The top portion T and the bottom portion B are smoothly continuously connected with the first portion $c_1$ or the second portion $c_2$ of the cam surface C.

The cam follower 12 is kept in contact with the cam surface C of the cam 14, for example, the bottom portion B, the first portion $c_1$, the top portion T and the second portion $c_2$, in order or the inverted order, when the cam 14 is rotated at a predetermined speed. As a result, the cam follower 12 is designed to make two reciprocal movements or back-and-forth rotational movements per rotation of the cam 14 with a stroke almost identical to the difference between the long and short radii of the cam 14.

As to the shape of the cam surface C of the cam 14, it is set to satisfy the following equation when a symbol $L_1$ denotes a distance between a center of the cam follower 12 and a center $O_2$ of the drive shaft 13.

$$L_1 = A + M \times \sin(2\theta)$$

wherein symbol A denotes a radius of a reference circle of the cam 14 having a radius which is equal to the short radius of the cam 14 plus half the difference between the long radius and the short radius of the cam 14. Also, symbol M denotes a distance between the top portion T of the cam 14 and the reference circle, or a distance between the bottom portion B and the reference circle and symbol $\theta$ denotes the angle identical to rotations of the drive shaft 13.

Also, a distance $L_2$, which is defined between the cam follower 12 and a center $O_1$ of oscillation of the oscillating shaft 11, is set to satisfy the following equation when a symbol $L_3$ denotes a distance between the center $O_1$ of oscillation of the oscillating shaft 11 and a center $O_2$ of the drive shaft 13.

$$L_1 + L_2 > L_3$$

Figure 4:
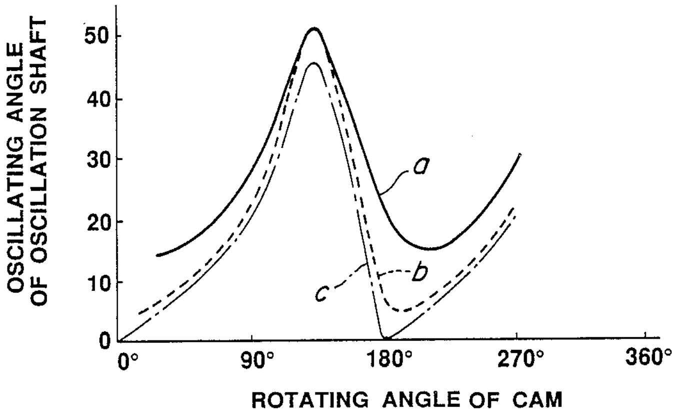
FIG. 4 is a diagram of a characteristic curve showing the change in angular acceleration with the number of revolutions of a cam as a parameter, the cam being mounted in the apparatus of FIG. 1.

In order to increase the angular acceleration obtained on the cam 14, $L_1$ plus $L_2$ must be extremely close to $L_3$. As seen in FIG. 4, the oscillating angle initially jumps by approaching $L_1$ plus $L_2$ to $L_3$ to increase the angular acceleration of the cam 14. In FIG. 4, a curve a denotes the change of the oscillating angle when a difference between $L_1$ plus $L_2$ and $L_3$ has a large comparative value and a curve b denotes the change when the difference has a small comparative value. Also, a curve c of FIG. 4 denotes the change when $L_1$ plus $L_2$ is identical to $L_3$. In this case, the curve c passes through dead points at equal cycles. In the dead points, the apparatus 10 including the cam 14 cannot be worked and the cam follower can be moved neither in a clockwise direction nor in a counterclockwise direction because the cam follower 12 is aligned with the oscillating shaft 11 and the rotating drive shaft 13.

The drive means 15 includes a pair of driven gears 20 fixedly disposed on the drive shafts 13 respectively, a pair of idle gears 21 engaged with the driven gears 20 respectively and a belt type power transmission means 24 for connecting a shaft 22 securely disposed on one of the idle gears 21 with an output shaft 23 of a drive motor to transmit power of the drive motor to the shaft 22 as shown in FIG. 2. According to the drive means 15, the respective drive shafts 13 are rotated in opposite directions and thereby the respective cams 14 are rotated in opposite directions to each other. When the load exerted on the oscillating shaft 11 changes suddenly or radically, the change of the load is smoothly absorbed by slipping of the belt in the power transmission means 24.

Figure 5:
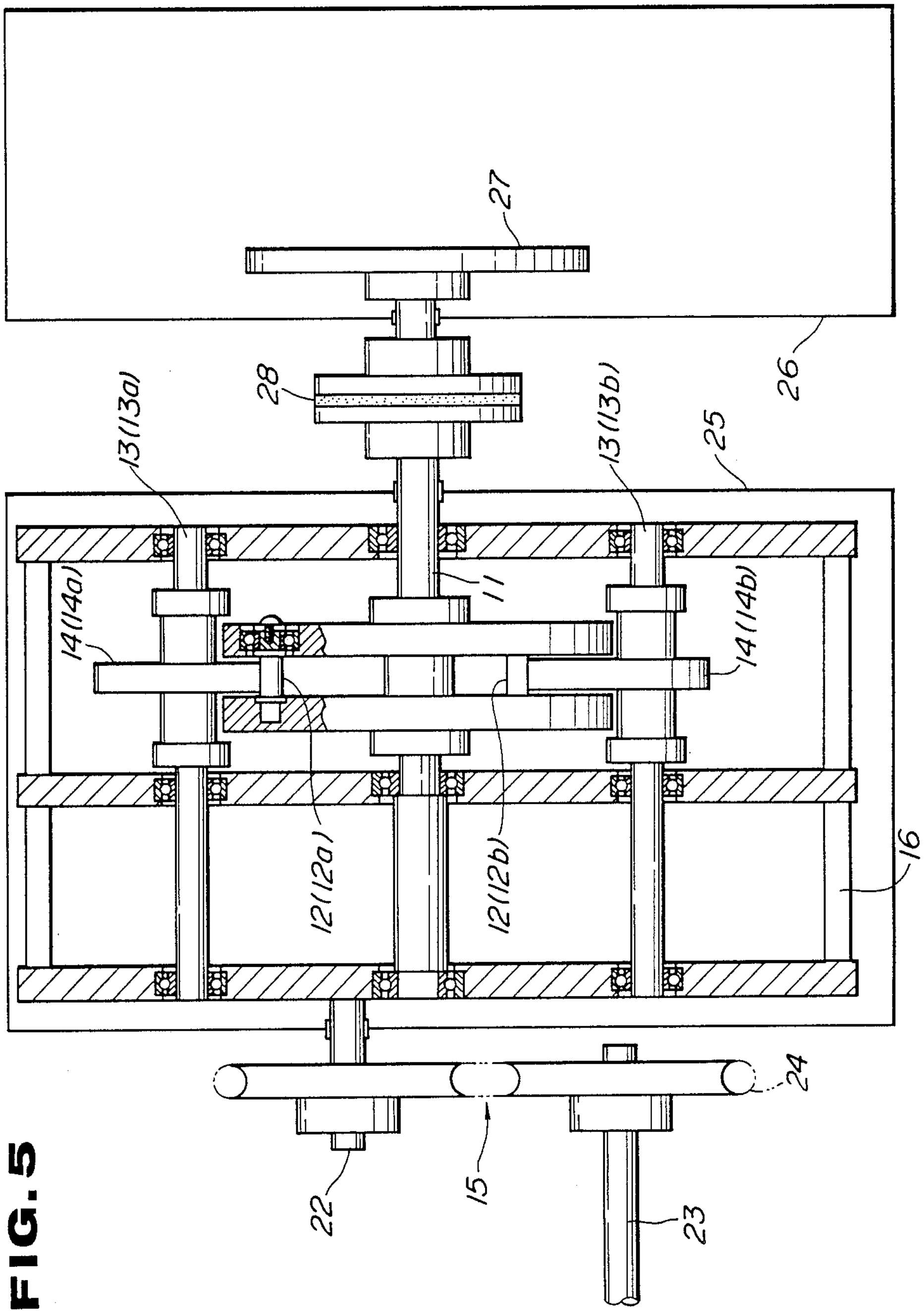
FIG. 5 is a schematic transverse cross-sectional view explaining a method for connecting the apparatus of FIG. 1 with another device.

As shown in FIG. 5, the thus described apparatus 10 is hermetically housed in a case 25 except the belt type power transmission means 24. In the hermetic case 25, rotary, sliding and rolling portions of the apparatus 10 are immersed in oils or lubricants to prevent them from over-heating. Also, the oils or the lubricants in the case 25 are led to a radiator (not shown) to exchange heat with ambient air and the like to prevent them from over-heating.

Furthermore, one end of the oscillating shaft 11 protrudes out through the hermetic case 25. The protruded end of the oscillating shaft 11 is connected to a plate 27 for holding a specimen in an instrument 26 such as an environment tester, etc. Considering that this instrument 26 may be used under high temperature, a plate 28 made of heat insulating material is interposed in a portion for connecting the protruded end of the oscillating shaft 11 to the specimen holding plate 27.

The operation of this embodiment of the invention will now be explained as follows.

First, the drive means 15 rotates the respective drive shafts 13*a* and 13*b* so as to rotate in opposite directions to each other at a steady speed as shown in FIG. 1. That is, one of the drive shafts is rotated in a clockwise direction and the other is rotated in a counter-clockwise direction.

In the above case, the cam follower 12*a* is angularly moved at a predetermined angle by virtue of the first portion $c_1$ of the cam 14*a* so as to be apart from the drive shaft 13*a*. The movement of the cam follower 12*a* continues till the cam follower 12*a* is guided to the top portion T of the cam 14.

Simultaneously, the cam follower 12*b* being in contact with the cam 14*b* is angularly moved at a predetermined angle by virtue of the second portion $c_2$ of the cam 14*b* so as to be close to the drive shaft 13*b* because the cam 14*b* is synchronously inversely rotated with the cam 14*a*. The movement of the cam follower 12*b* continues till the cam follower is guided to the bottom portion B of the cam 14*b*.

As a result, the oscillating shaft 11 is rotated at an angle defined between the maximum oscillation position in the clockwise direction and the maximum oscillation position in the counterclockwise direction.

When both cams 14*a* and 14*b* are further rotated, the cam follower 12*b* is angularly moved at a predetermined angle by virtue of the first portion $c_1$ of the cam 14*b* so as to be apart from the drive shaft 13*b*. Simultaneously, the cam follower 12*a* is angularly moved at a predetermined angle by virtue of the second portion $c_2$ of the cam 14*a* so as to be close to the rotation drive means 13*a*. In this case, the oscillating shaft 11 is angularly oscillated at the angle identical to the shifts of the cam followers 12*a* and 12*b* in a clockwise direction.

Hereafter, the oscillating shaft 11 is oscillated at the rate of two back-and-forth rotational movements per rotation of both cams 14*a* and 14*b*.

With the above described apparatus 10, the oscillation of the oscillating shaft 11 depends on a shape of the cam surface C of the cam 14, that is, a profile of the cam 14. Therefore, various oscillation patterns can be obtained by changing the profile of the cams 14.

Figure 6:
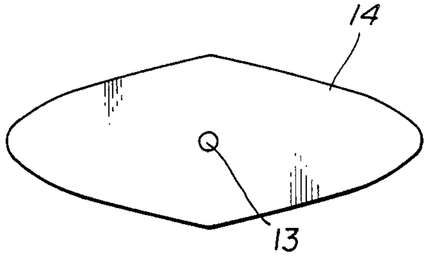
FIGS. 6 to 8 are schematic plan views showing variations of shape of cams used in the present invention, respectively.
Figure 7:
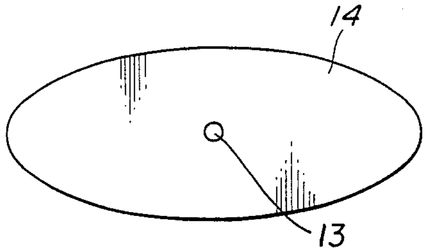
Figure 8:
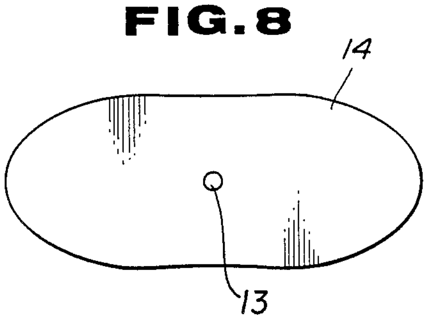

FIGS. 6 to 8 show variations of shape of the cam 14 which includes a pair of the first portion $c_1$ and a pair of the second portion $c_2$. FIG. 6 shows a double hyperbolic shape, that is, two hyperbolic shapes are combined with respect to a vertical center line perpendicular to the axis of drive shaft 13. FIG. 7 shows a elliptical shape, and FIG. 8 shows a double elliptical shape, that is, two ellipses overlapping each other.

Also, one direction of the oscillation is performed by only one cam 14 and the cam follower 12 is guided by the other cam 14 while the other cam 14 keeps in contact with the cam follower 12. Therefore, the oscillation can be smoothly performed without effort, the large angular acceleration can be obtained while preventing the cam follower 12 from backlash.

In the above described embodiment, rotations of both drive shafts 13 or both cams 14 may be set in the same direction by virtue of omitting one of the idle gears 21.

Also, both cams 14 can be synchronously rotated in an inverse direction or a direction which is different from a direction of rotation of the cam 14 in the above described embodiment. In this case, the second portion $c_2$ of the cam 14*b* presses the cam follower 12*b*. The cam follower 12*b* runs on a long way for a short time because the second portion $c_2$ of the cam 14*b* is longer in a longitudinal direction than the first portion $c_1$ thereof. Therefore, the apparatus 10 can be steadily utilized for a long period because a torque exerted on the oscillating shaft 11 is small.

Figure 9:
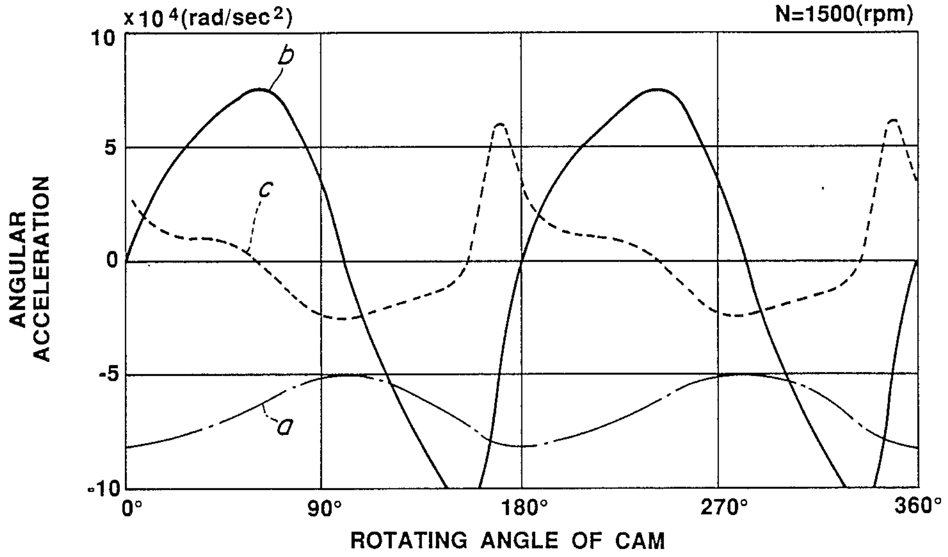
FIG. 9 is a diagram of a characteristic curve showing the change in angular oscillation, angular velocity and angular acceleration in the apparatus of FIG. 1.

FIG. 9 shows the oscillating angle, the angular velocity and the angular acceleration of the oscillating shaft 11 with respect to the rotational angle of the cam 14, respectively. In FIG. 9, a curve a denotes the oscillating angle of the oscillating shaft 11, a curve b denotes the angular velocity thereof and a curve c denotes the angular acceleration thereof.

Figure 10:
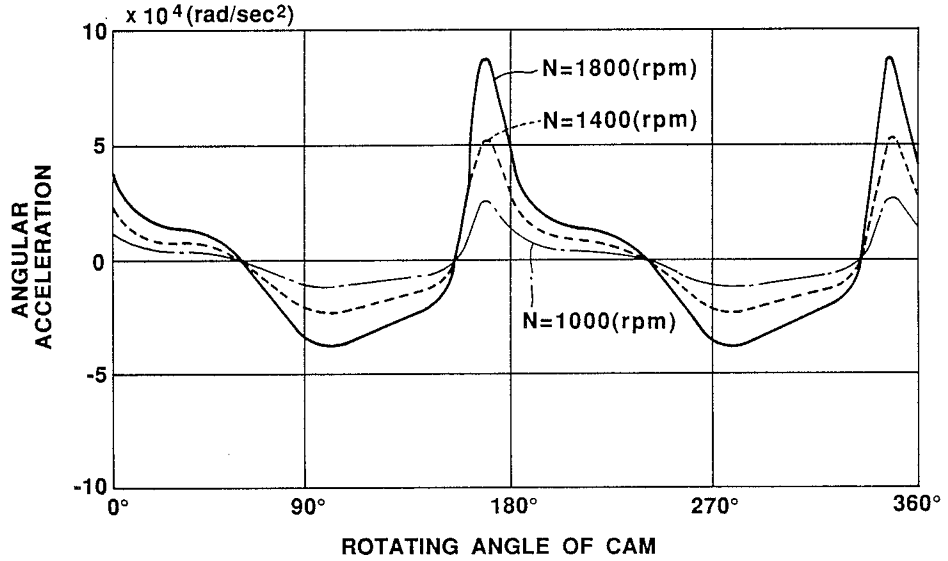
FIG. 10 is a diagram of a characteristic curve showing an oscillation of the oscillating shaft when the cam follower, the drive shaft and the oscillating shaft in the apparatus of FIG. 1 have the relation indicated by the equation $L_1+L_2>L_3$.

FIG. 10 shows the change in angular acceleration with the number of revolutions of the cam 14 as a parameter. As seen in FIG. 10, a large angular acceleration of $1\times10^5$ rad/sec.$^2$ is obtained at a comparatively low number of revolutions of 1,800 rpm.

Figure 11:
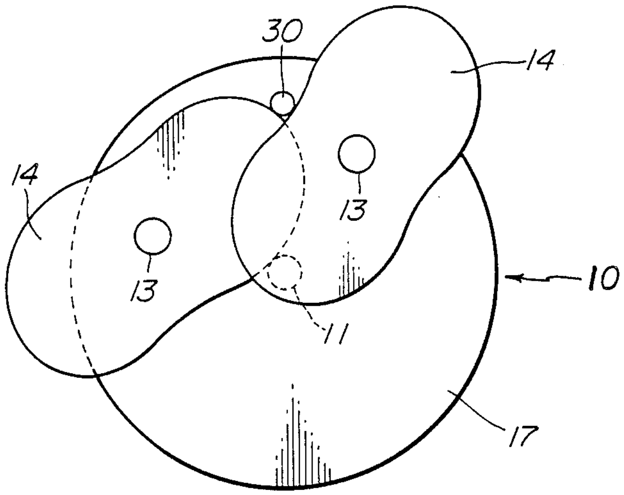
FIG. 11 is a schematic plan view showing a part of a second modified apparatus in accordance with the present invention.
Figure 12:
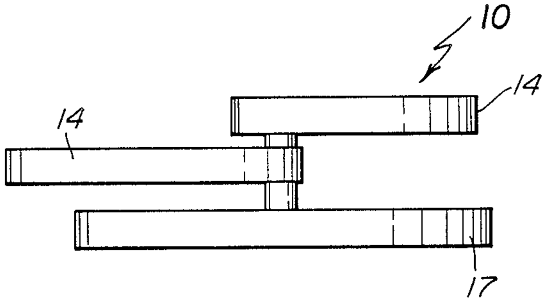
FIG. 12 is a schematic transverse view showing the apparatus of FIG. 11.

FIGS. 11 and 12 show another preferred embodiment of the present invention which has a significant difference from the first embodiment previously described. One difference between the second embodiment and the first embodiment is that there is only one cam follower 30 radially spaced from the oscillating shaft 11 at a predetermined interval. The drive shafts 13 are radially spaced from the oscillating shaft 11 on both sides facing the cam follower 30, respectively. Each of the cams 14 is rotatably disposed on the respective drive shafts 13 so that their surfaces C are kept in contact with the cam follower 30. The cams 14 are partially interposed over each other.

In this embodiment, the oscillating shaft 11 can be steadily exactly oscillated by synchronously rotating the cams 14 in the same manner of the first embodiment. Also, the small-sized apparatus 10 can be prepared because a distance between the drive shafts 13*a* and 13*b* can be reduced.

Figure 13:
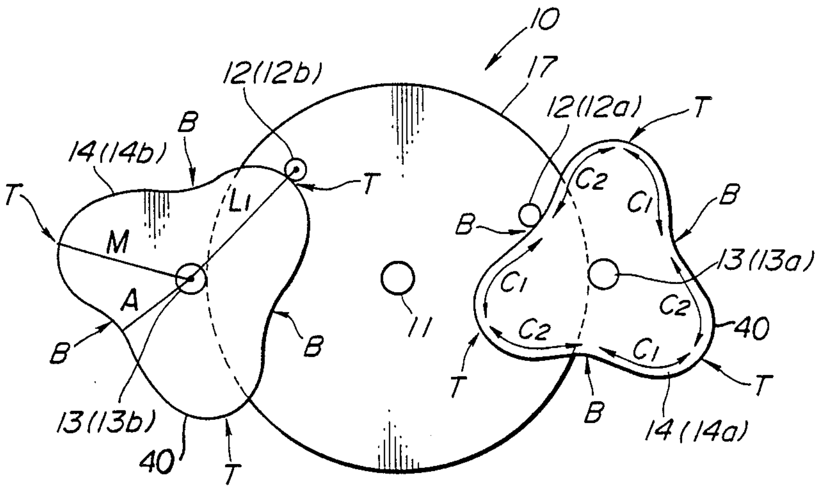
FIG. 13 is a schematic plan view showing a third modified apparatus in accordance with the present invention.
Figure 14:
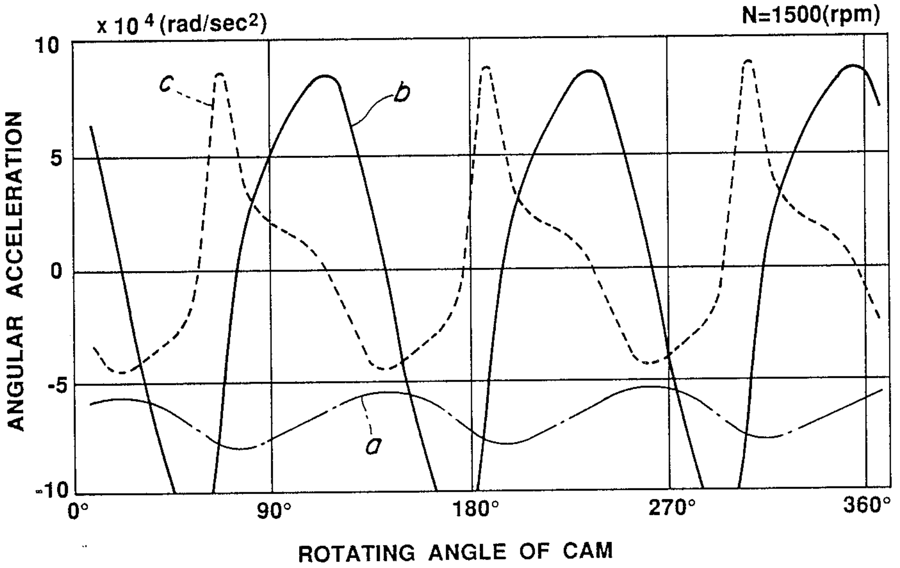
FIG. 14 is a diagram of a characteristic curve showing the change in angular oscillation, angular velocity and angular acceleration in the apparatus of FIG. 13.

FIGS. 13 and 14 show a further preferred embodiment of the present invention which has a significant difference from the first embodiment previously described. One difference between the third embodiment and the first embodiment is that there is a pair of cams having three top portions T formed at the periphery thereof at equal angular intervals about a center thereof and three bottom portions B formed at positions defined between the top portions T at equal angular intervals about the center thereof. Therefore, each of the cam surfaces C of the cams 40 has three first portions $c_1$ and three second portions $c_2$ formed between the first portions $c_1$. As shown in FIGS. 9 and 14, the cam 40 of this embodiment can generate a large angular acceleration in comparison with the cam 14 of the first embodiment when both cams 14 and 40 are rotated at the same angle.

Figure 15:
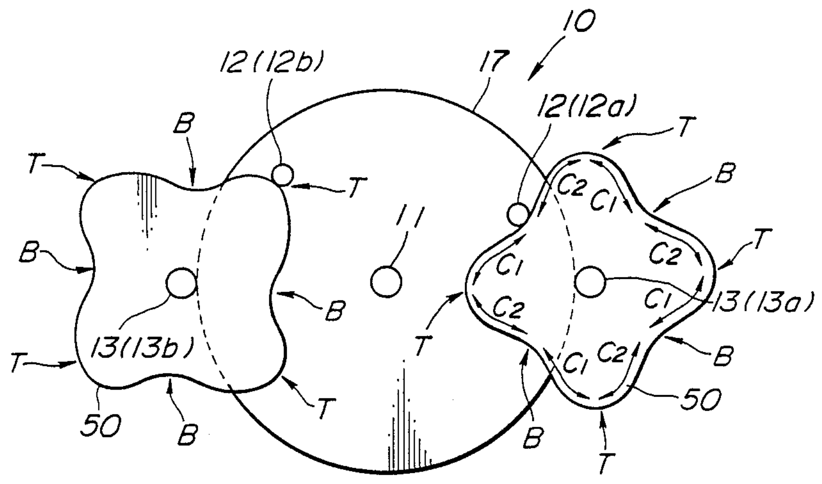
FIG. 15 is a schematic plan view showing a fourth modified apparatus in accordance with the present invention.
Figure 16:
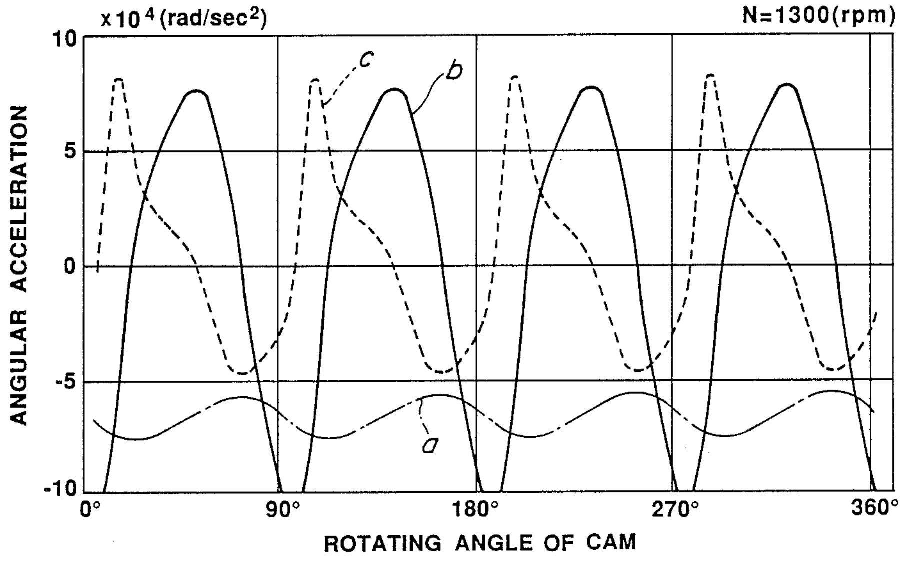
FIG. 16 is a diagram of a characteristic curve showing the change in angular oscillation, angular velocity and angular acceleration in the apparatus of FIG. 15.
Figure 17:
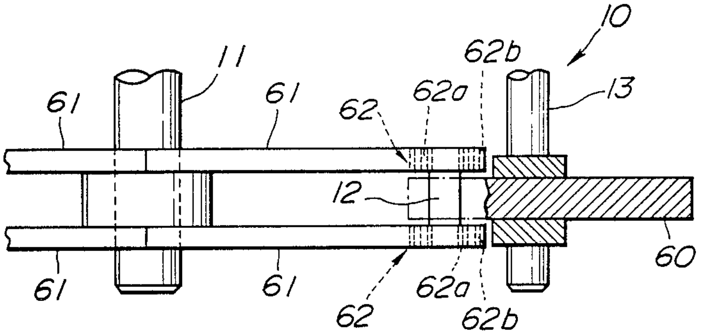
FIG. 17 is a schematic transverse cross-sectional view showing a fifth modified apparatus in accordance with the present invention.
Figure 18:
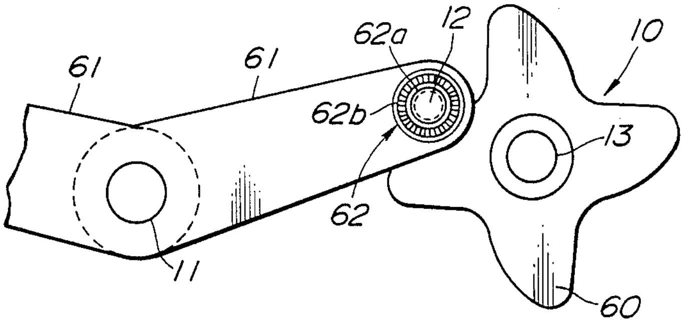
FIG. 18 is a schematic plan view showing the apparatus of FIG. 17.

FIGS. 15 and 16 show another preferred embodiment or fourth embodiment which a significant difference from the third embodiment previously described. One difference between the fourth embodiment and the third embodiment is that there is a pair of cams 50 having four top portions T formed at the periphery thereof at equal angular intervals about the center thereof and four bottom portions B formed at positions defined between the top portions T at equal angular intervals about the center thereof. As shown in FIGS. 14 and 16, the cam 50 of this embodiment can generate an angular acceleration almost identical to that of the cam 40 of the previous embodiment though the number of rotations of the cam 50 is less than that of the cam 40.

Therefore, a large angular acceleration of the oscillating shaft can be obtained by increasing numbers of the top portion T and the bottom portion B while rotating the cam at a comparative low speed. In other words, an adequate angular acceleration can be obtained by predetermining the number of the top portions T and the like if required. Simultaneously, resonance in the apparatus 10 can be avoid by changing the numbers N of rotation of the cam while keeping the adequate angular acceleration.

FIGS. 17 to 21 show another preferred embodiment or fifth embodiment which has two significant differences from the first embodiment previously described. One difference between this embodiment and the first embodiment is that there is a cam 60 having opposite ends which are crossed at right angles with the drive shaft 13. The other difference is that there is a pair of support members 61 for supporting the cam followers 12 therebetween, the respective support members 61 securely disposed on the oscillating shaft 11 at a predetermined interval in a longitudinal direction of the oscillating shaft 11.

This embodiment will now be explained in detail as follows.

Each of the cam followers 12 has opposite ends and has a substantially cylindrical shape. Each of the ends of the cam followers 12 is inserted into an inner race 62*a* of a roller bearing 62 to be fixedly connected with the roller bearing 62.

Each of the support members 61 has an approximate plate shape. The support members 61 are fixedly radially disposed on the oscillating shaft 11 at a predetermined angle defined between both support members 61 about the oscillating shaft 11. An interval defined between at least ends of the support members 61 is predetermined so that a part of the cam 60 is smoothly inserted thereinto with no contact. Each of outer races 62*b* of the roller bearing 62 is fixedly disposed at the ends of the support members 61. Therefore, the cam follower 12 is securely supported through the roller bearing 62 between a pair of the support members 61.

With the above described apparatus 10, first, the cam 60 is rotated at a predetermined rate by operating the drive shaft 13. The cam follower 12 is angularly moved at a predetermined angle on the basis of a shape of the cam 60 and the oscillating shaft 11 is steadily oscillated at a predetermined stroke on the basis of the movement of the cam follower 12. A load or force transmitted from the cam 60 to the cam follower 12 is divided between a pair of the roller bearings 62. Therefore, the force exerted on the respective roller bearings 62 is efficiently reduced.

The roller bearing 62 is a member for only supporting the cam follower 12. Configurations of the roller bearing 62 are not limited by those of the cam 60 and can be freely set if required. As a result, the large-sized roller bearing 62 can be easily used in the apparatus 10 and serves to obtain a large angular velocity and angular acceleration with respect to the oscillating shaft 11. Further, the small-radius cam follower 12 can be easily used in the apparatus 10 because the roller bearing 62 is operated with almost no influence due to the use of the small-radius cam follower 12.

As above described, when the small-radius cam follower 12 is used in the apparatus 10, it prevents the periphery of the cam 60 from wearing even though the cam 60 size is minimized. Therefore, the cam 60 size can be easily minimized. Also, when the small-radius cam follower 12 is used, the endurance of the cam follower 12 and the roller bearing 62 can be improved because rotational rates thereof are reduced.

Furthermore, components of the apparatus 10 can be minimized in order that the apparatus 10 is minimized. Also, weight of the movable components can be reduced in order that the power of the driving system can be reduced.

Figure 19:
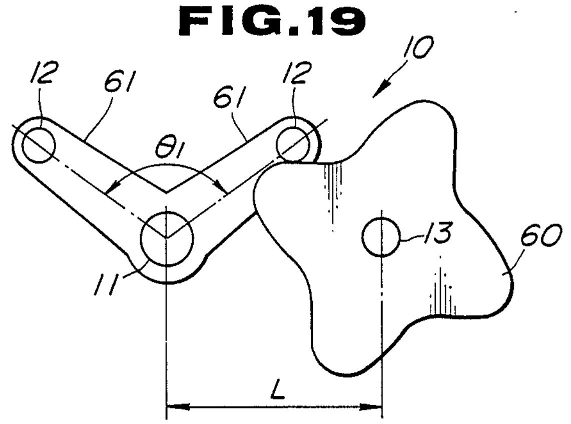
FIGS. 19 to 21 are schematic plan views showing variations of shapes of cams in accordance with variations of angles defined between a pair of cam followers and an oscillating shaft.
Figure 20:
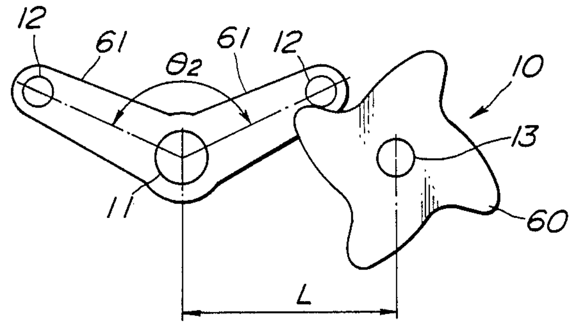
Figure 21:
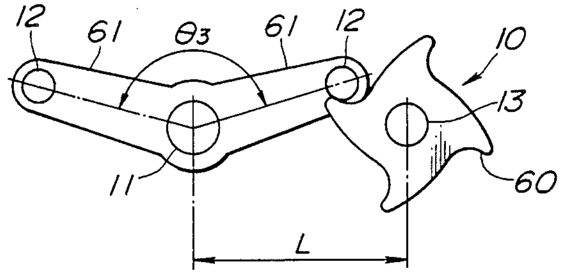

As seen in FIGS. 19 to 21, in the case that an angle defined between both support members 61 is set so as to became larger in order to further minimize the cam 60 size, the cam 60 having a smooth C shaped cam surface can be obtained. In this point, use of the minimized cam 60 is increased.

FIGS. 22 to 25 show another preferred embodiment or sixth embodiment which one significant difference from the fifth embodiment previously described. The difference between this embodiment and the fifth embodiment is that each of the cams 60 has configurations or shapes which are predetermined on the basis of polar coordinates indicated by the following equations (1) to (4) when a center $0_2$ of rotation of the cam 60 is the origin.

$$R=\{(Ra\times \mathrm{Sin}\theta)^2+(La-Ra\times \mathrm{Cos}\theta)^2\}^{\frac{1}{2}} \tag{1}$$

$$\Gamma=\pi-\tan^{-}(Id/2b)+\alpha \tag{2}$$

$$Ia=Ra\cdot \mathrm{Sin}\theta \tag{3}$$

$$Ib = La - Ra \cdot \cos\theta \quad (4)$$

wherein a symbol R denotes a distance between the center $0_2$ of the cam 60 and a center $0_3$ of the cam follower 12, a symbol $\psi$ denotes an angle from a line which is formed between the center of the oscillating shaft 11 and the center of the drive shaft 13 to a line which is so placed that the distance between the center of the drive shaft 13 and the center of the respective cam followers 12 becomes R, a symbol Ra denotes a distance between an axis of oscillation of the oscillating shaft 11 and an axis of rotation of the cam follower 12, a symbol La denotes a distance between the axis of oscillation of the oscillating shaft 11 and an axis of rotation of the drive shaft 13, a symbol $\theta$ denotes an angular oscillation of the oscillating shaft 11 and a symbol $\alpha$ denotes a rotational angle of the cam 60.

Figure 22:
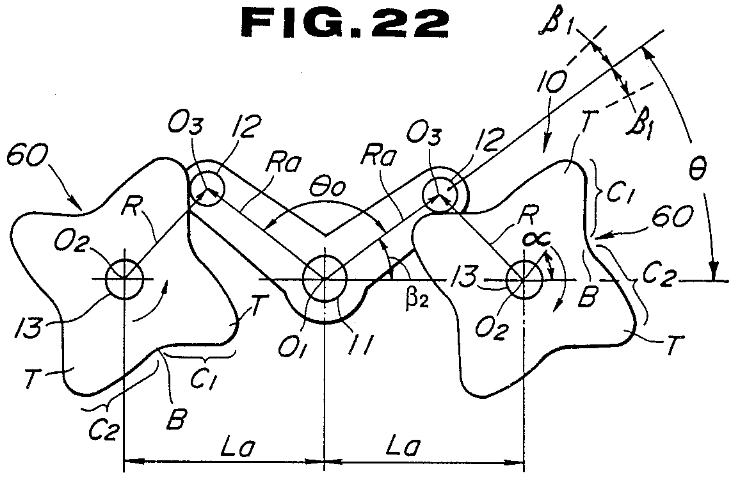
FIG. 22 is a schematic plan view showing another modified apparatus in accordance with the present invention.
Figure 23:
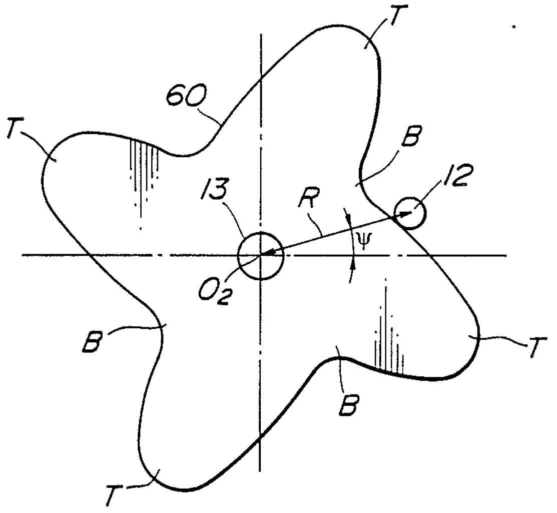
FIG. 23 is a schematic plan view showing another modified cam mounted in the apparatus of FIG. 22.

Further, when the maximum angle of oscillation of the oscillating shaft 11 is denoted by a symbol $\delta_1$, the oscillating angle $\theta$ is represented by the following equation (5).

$$B_1.\mathrm{Sin}(nx) \quad (5)$$

wherein a symbol n denotes numbers of the top portions T formed at the cam 60. In FIGS. 22 and 23, the symbol n denotes 4 because the cam 60 has four top portions T.

In the equation (5), the symbol $\beta_2$ is indicated by the following equation (6) when a symbol $\theta_0$ denotes an angle defined between two imaginary lines by connecting the center $0_1$ of the oscillating shaft 11 to both center $0_3$ of the cam followers 12.

$$\beta_2 = (\pi - \theta_0)/2 \quad (6)$$

Accordingly, the rotation of the cams 60 by angle $\alpha$ moves the cam followers 12 as the sine wave in which the amplitude is two times of the angle $\beta_1$, that is, the cam followers 12 are moved back and forth by $\beta_1$ with respect to the angle $\beta_2$.

Also, the distances Ra, La and R are determined so as to satisfy the relation thereof indicated by the following equation (7).

$$Ra + R > La \quad (7)$$

Each of the cams 60, having configurations determined on the basis of the various relations indicated by the previous equations (1) to (7), includes two pairs of the top portions T and two pairs of bottom portions B formed one after the other in the rotary direction of the cam 60. Also, the top portion T is smoothly continuously connected to the bottom portions B relevant thereto.

In the apparatus 10, the cam followers 12 are designed to make four reciprocal movements per rotation of the cam 60 with a stroke almost identical to the difference between the long and short radii of the cam 60, that is, the difference between a distance from the center $0_2$ of the cam 60 to the top portion T and a distance therefrom to the bottom portion B. The oscillating shaft 11 is oscillated by virtue of the reciprocal movement of the cam followers 12.

Patterns of the oscillation of the oscillating shaft 11 will now be explained with reference to FIGS. 24 and 25.

As above described, the oscillation of the oscillating shaft 11 depends on the configurations of the cam 60 determined on the basis of the relations indicated by the previous equations.

Figure 24:
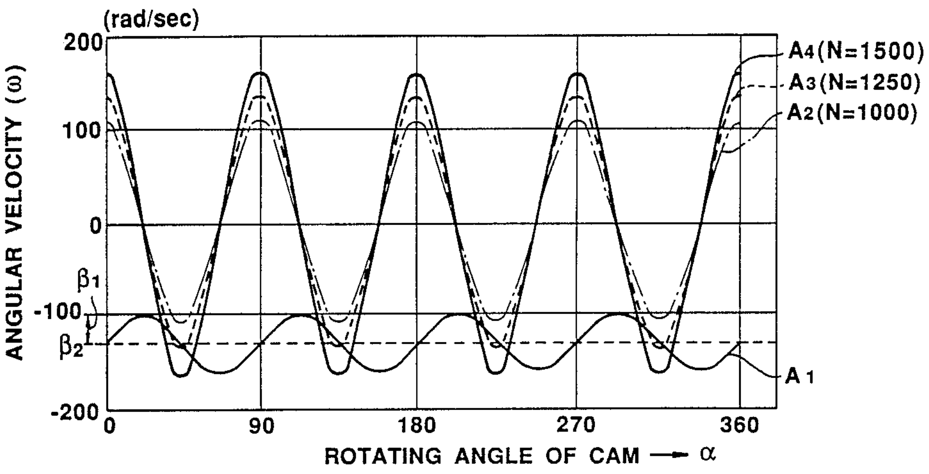
FIG. 24 is a diagram of characteristic curves showing the change in angular velocity with the number of revolutions of a cam as a parameter, the cam being mounted in the apparatus of FIG. 22.

Although the oscillating angle $\theta$ of the oscillating shaft 11 is denoted by the previous equation (5), because the symbol $\alpha$ denotes a function of time, a change with time in the oscillating angle $\theta$ is indicated by a curve $A_1$ shown in FIG. 24. The change is represented by a sine wave.

Also, the angular velocity $\omega$ generated by virtue of the oscillation of the oscillating shaft 11 is indicated by the following equation (8) which is obtained by differentiating the previous equation (6) with time t.

$$\omega = d\theta/dt = n \cdot a \cdot N \cdot \beta_1 \cdot \mathrm{Cos}(n\theta) \quad (8)$$

The change in the angular velocity $\omega$ is indicated by curves $A_2$, $A_3$ and $A_4$ shown in FIG. 24 when numbers N of rotation of the cam 60 is used as a parameter.

As seen from these results, the angular velocity $\omega$ generated by virtue of the oscillation of the oscillating shaft 11 is represented by the sine curve as well as the change time in the oscillating angle $\theta$.

Further, the angular acceleration $\dot{\omega}$ is indicated by the following equation (9) which is obtained by differentiating the previous equation (8) with time t.

$$\dot{\omega} = d\omega/dt = -n^2 \cdot a \cdot N^2 \cdot \beta 1 \cdot \mathrm{Sin}(n\theta) \quad (9)$$

The change in the angular velocity $\omega$ is indicated by curves $A_2$, $A_3$ and $A_4$ shown in FIG. 24 when numbers N of rotation of the cam 60 is used as a parameter.

As seen from these results, the angular velocity $\omega$ generated by virtue of the oscillation of the oscillating shaft 11 is represented by the sine curve as well as the change with time in the oscillating angle $\theta$.

Further, the angular acceleration $\dot{\omega}$ is indicated by the following equation (9) which is obtained by differentiating the previous equation (8) with time t.

$$\dot{\omega} = d\omega/dt = -n^2 \cdot a \cdot N^2 \cdot \beta_1 \cdot \mathrm{Sin}(n\theta) \quad (9)$$

Figure 25:
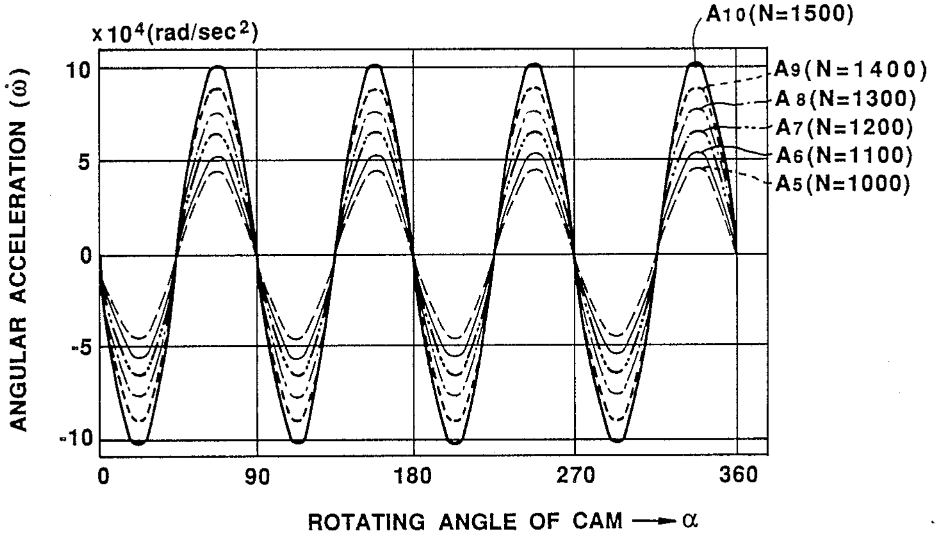
FIG. 25 is a diagram of characteristic curves showing the change in angular acceleration with the number of revolutions of a cam as a parameter, the cam being mounted in the apparatus of FIG. 22.

The change in the angular acceleration $\dot{\omega}$ is indicated by curves $A_5$, $A_6$, $A_7$, $A_8$, $A_9$and $A_{10}$ shown in FIG. 25 when the numbers N of rotation of the cam 60 is used as a parameter. Therefore, the angular acceleration $\dot{\omega}$ is represented by the sine curve as well as the oscillating angle $\theta$ and the angular velocity $\omega$. As seen from FIG. 25, a large angular acceleration of $1 \times 10^5$ rad/sec.$^2$ is obtained when the cam 60 is rotated at a comparative low numbers of rotation, e.g., 1500 rpm.

In this embodiment, the change with time in the oscillating angle, the angular velocity and the angular acceleration as oscillating characteristics of the oscillating shaft 11 can be represented by the sine curve, respectively. In this point, the oscillating conditions given to objects to be tested can be handled as constant and known ones when this embodiment is used as an oscillating testing machine. Therefore, results obtained from this embodiment used as the oscillation testing machine can be easily analyzed. Moreover, the results can be easily analyzed because the going motion and returning motion of the oscillation can be given symmetrically by virtue of the oscillating characteristics represented by the sine wave.

Further, because the oscillating shaft 11 is subjected to only pressure made by virtue of a pair of cams 60, the steady oscillation and the large angular acceleration can be obtained.

In the respective embodiments of the present invention as previously described, various configurations and sizes of each component are shown as an example and can be variable on the basis of design requirements.

What we claim is:

1. An oscillation generating apparatus comprising:

an oscillating shaft supported rotatable about an axis thereof;

first and second cam followers attached eccentric to said oscillating shaft;

at least a pair of drive shafts disposed parallel to said oscillating shaft and adapted to be connected to drive means to be rotated thereby;

at least a pair of cams each having a cam surface and attached to the pair of drive shafts for rotational movement therewith and kept in sliding contact with said cam follower, the shape and location of said cams being so determined that at least one of said cams gives thrust force to said cam follower at any rotational angle of said oscillating shaft as said drive shafts are being rotated; whereby rotational movement of said drive shafts being converted to a back-and-forth rotational movement of said oscillating shaft;

said first and second cam followers separated from one another in an oscillation direction, and are put in contact with each cam surface of said respective cams;

wherein each of said cam surfaces of said cams is formed so that the locus of the movement of a center of said first and second cam followers is indicated by polar coordinates on the basis of following equations (1) to (4) when a center of rotation of said respective cams is the origin:

$$R=\{((Ra\times \mathrm{Sin}\theta)^2+(La-Ra\times \mathrm{Cos}\theta)^{2=\frac{1}{2}} \quad (1)$$

$$\psi=\pi-[\tan(A/B)+\alpha]\tan^{-1}(I_a/I_b)+\alpha \quad (2)$$

$$I_a[A]=Ra\cdot \mathrm{Sin}\theta \quad (3)$$

$$I_b[B]=La-Ra\cdot \mathrm{Cos}\theta \quad (4)$$

$$\theta=\beta_1\cdot \mathrm{Sin}(\eta\alpha)+\beta_2 \quad (5)$$

wherein symbol R denotes a distance between each center of rotation of said respective cams and each center of said first and second cam followers, symbol $\psi$ denotes an angle from a line which is formed between a center of said oscillating shaft and a center of said drive shaft to a line which is so placed that the distance between the center of said drive shaft and the center of said respective cam followers becomes R, symbol Ra denotes a distance between an axis of oscillation of said oscillating shaft and said cam follower, symbol La denotes a distance between the axis of oscillation of said oscillating shaft and the axis of said drive shaft, symbol $\theta$ denotes an angular oscillation of said oscillating shaft, symbol $\alpha$ denotes a rotational angle of said cam, $\beta_1$ denotes a maximum angle of oscillation of said oscillating shaft, and $\beta_2$ denotes an angle from a line which is formed between the center of said oscillating shaft and the center of said drive shaft to a line of Ra.

2. An oscillation generating apparatus according to claim 1 wherein said drive shafts are disposed on both sides facing said cam follower.

3. An oscillation generating apparatus according to claim 1 wherein the directions of rotation of said both drive shafts are opposite to one another.

4. An oscillation generating apparatus according to claim 1 wherein the direction of rotation of said one drive shaft is identical to that of said another drive shaft.

5. An oscillation generating apparatus according to claim 1, wherein said respective cams have at least one pair of first cam surfaces and at least one pair of second cam surfaces, said first and second cam surfaces are formed at the periphery of said respective cams one after the other in the direction of rotation of said respective cams.

6. An oscillation generating apparatus according to claim 5, wherein said cam follower, said drive shaft and said oscillating shaft are spaced relative to one another according to the relation indicated by the following equation:

$$L_1+L_2>L_3$$

wherein $L_1$ is a distance between said cam follower and said drive shaft, $L_2$ is a distance between said cam follower and said oscillating shaft and, $L_3$ is a distance between said oscillating shaft and said drive shaft.

7. An oscillation generating apparatus according to claim 1 further comprises a pair of support means for rotatably supporting said respective cam followers therebetween, said support means being securely disposed on said osicllating shaft at right angles with said oscillating shaft and separated from one another at a distance in a longitudinal direction of said oscillating shaft, wherein said cam has a plain face extending along a face which is at right angles with said drive shaft and said respective cam followers are put in contact with said cam surface of said cam so that said respective cam followers are oscillated in accordance with the rotation of said cam.

8. An oscillating shaft as recited in claim 1, further comprising a pair of support members radially disposed on said oscillating shaft to support said cam followers.

9. An oscillating shaft as recited in claim 8, further comprising a pair of roller bearings secured to said support members, and said cam followers are secured to said roller bearings.

10. An oscillating shaft as recited in claim 9, wherein said support members are spaced apart to receive said cam therebetween.

* * * * *

UNITED STATES PATENT AND TRADEMARK OFFICE
CERTIFICATE OF CORRECTION

PATENT NO. : 4,969,368
DATED : November 13, 1990
INVENTOR(S) : Tadashi Sekine and Tsuneo Akuto It is certified that error appears in the above—identified patent and that said Letters Patent is hereby corrected as shown below:

Col. 8 line 66, Equation (2), cancel in its entirety and replace with:

$$\psi = \pi - \tan^{-1}(I_a/I_b) + \alpha \quad (2)$$

Col. 9 line 23, Equation (5), cancel in its entirety and replace with:

$$\theta = \beta_1 \cdot \mathrm{Sin}(n\alpha) + \beta_2 \quad (5)$$

In the Claims:

Claim 1, col. 11 line 38, cancel "[tan (A/B) +α]";
line 39, cancel "[A]";
line 41, cancel "[B]".

Signed and Sealed this

Eighth Day of December, 1992

Attest:

DOUGLAS B. COMER

Attesting Officer

Acting Commissioner of Patents and Trademarks